June 23, 1931.  G. C. COOK  1,811,455
REGENERATIVE AIR PREHEATER
Filed April 10, 1926  4 Sheets—Sheet 1
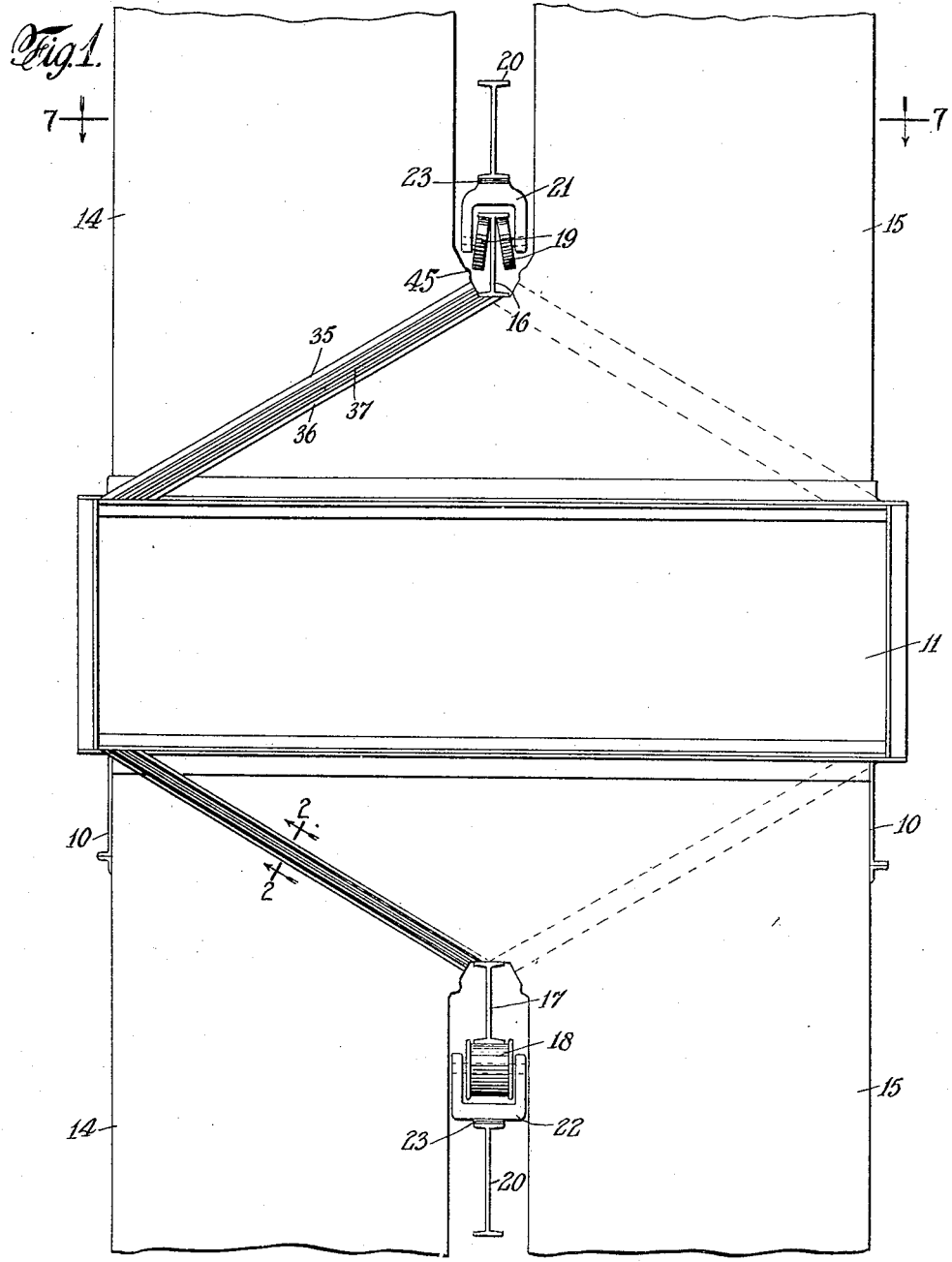
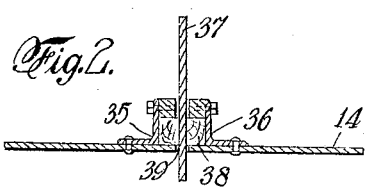
INVENTOR
George C. Cook
BY
ATTORNEY

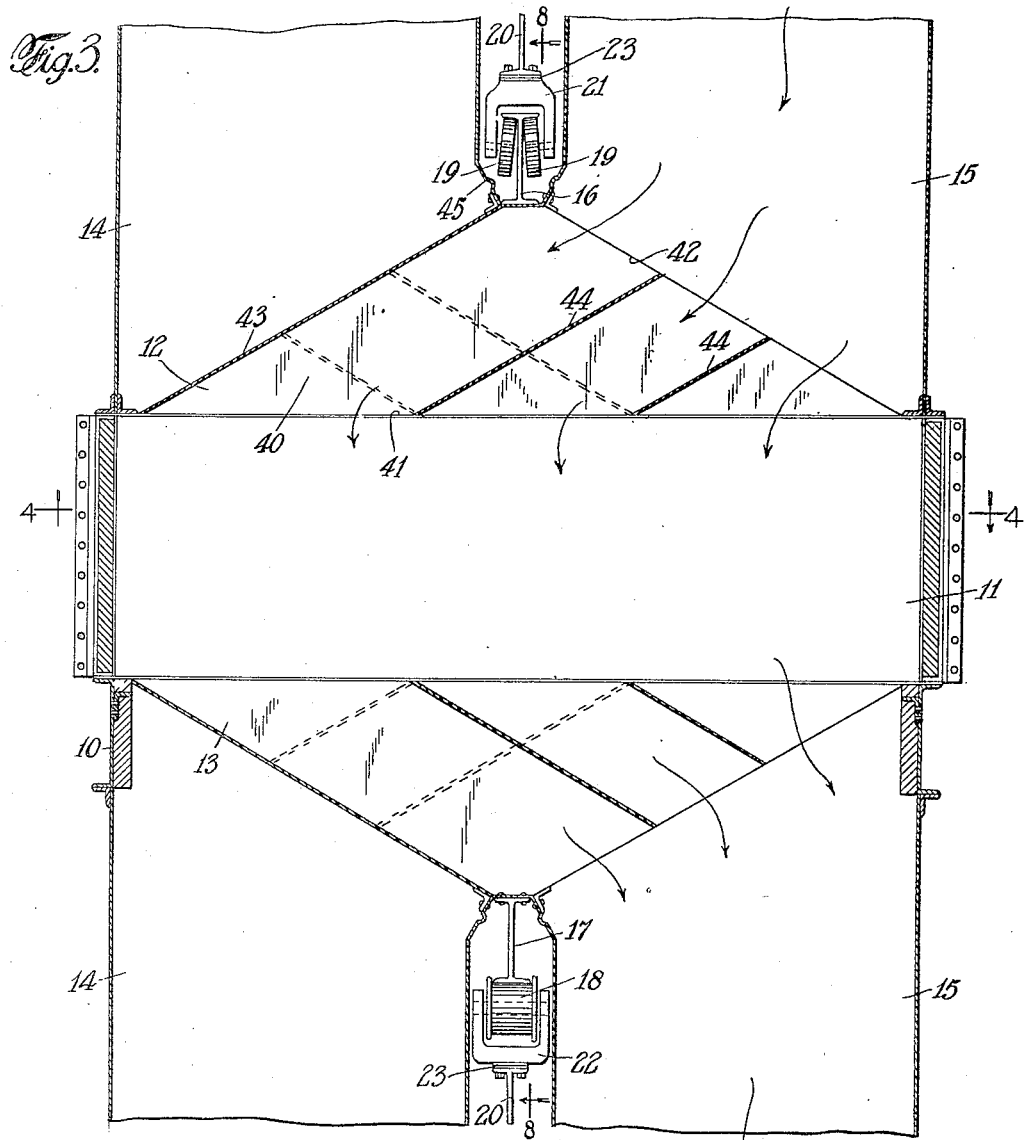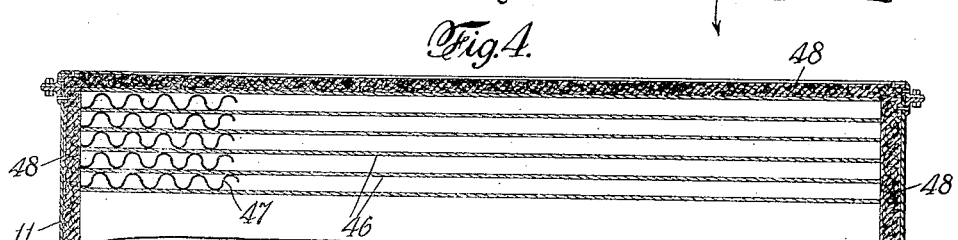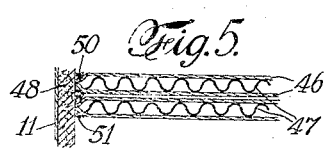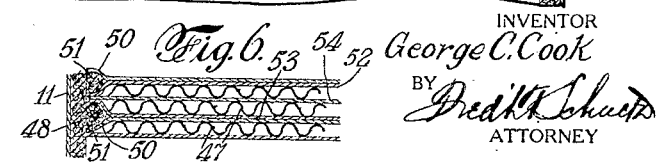

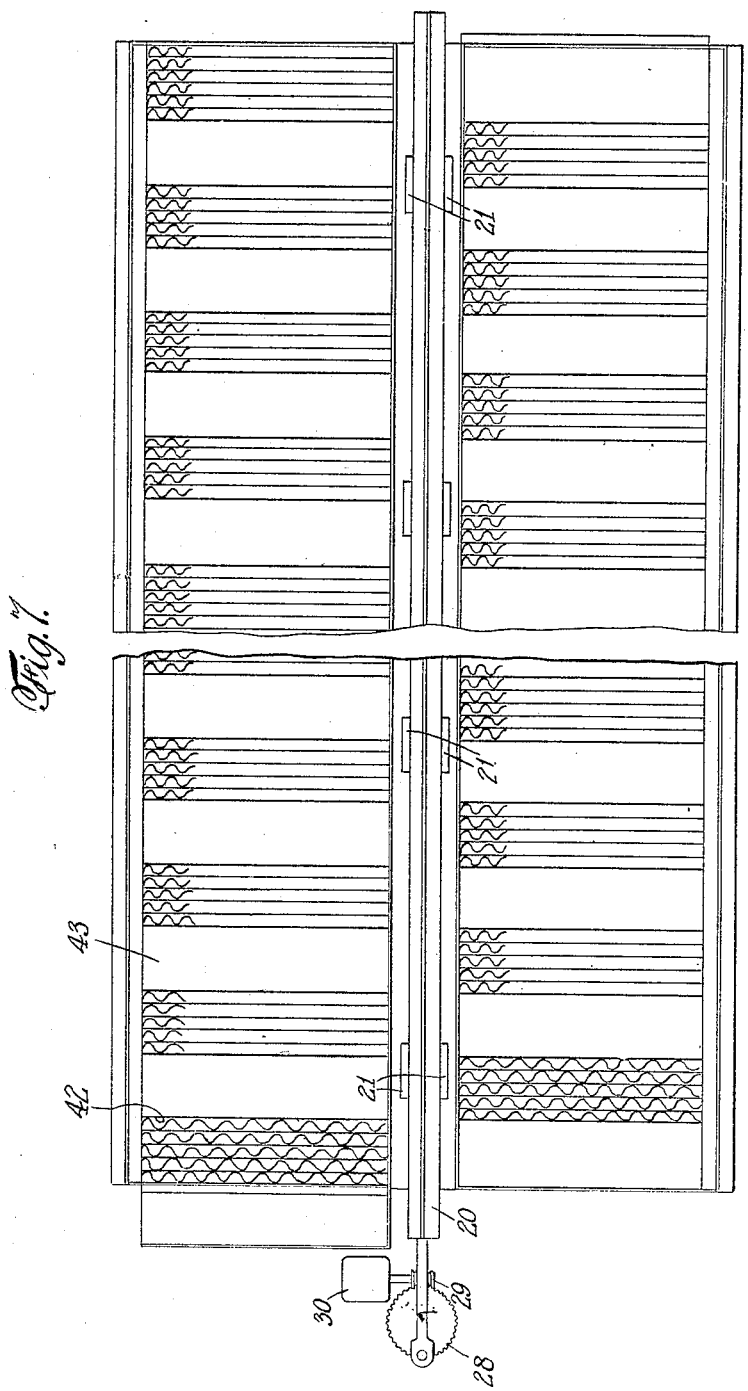

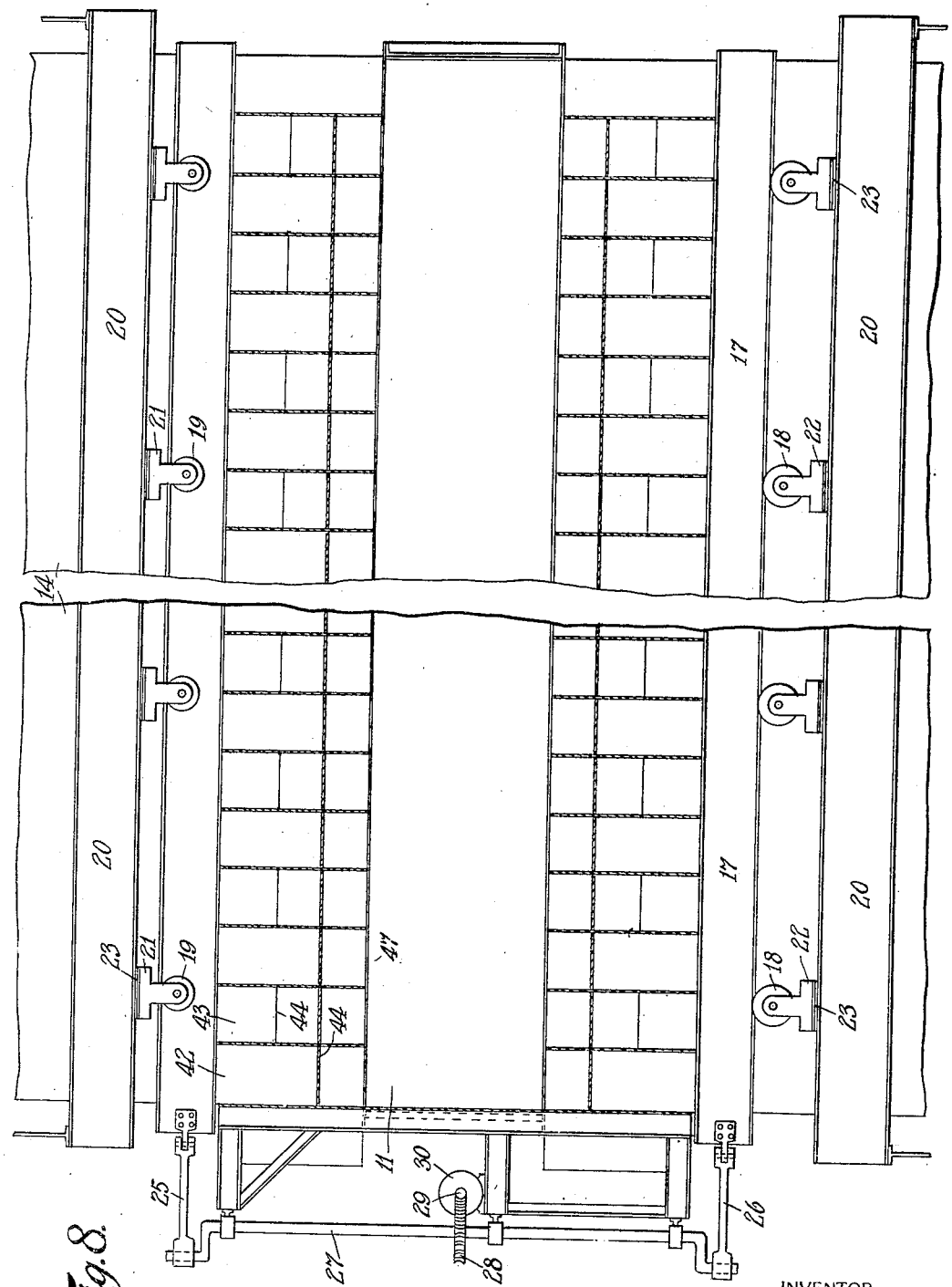

Patented June 23, 1931

1,811,455

UNITED STATES PATENT OFFICE

GEORGE C. COOK, OF MILLINGTON, NEW JERSEY

REGENERATIVE AIR PREHEATER

Application filed April 10, 1926. Serial No. 101,032.

The invention relates to a regenerative air preheater or apparatus designed to recover heat from waste gases, such as may be employed in connection with the combustion of coal to heat the combustion air supplied and thereby secure greater efficiency in the furnace operation. The invention relates more especially to that type of preheater in which the regenerative mass, thru which the waste gases and air are designed to be alternately directed, may remain stationary.

It has for its object apparatus of this character whereby the space required therefor is a minimum and wherein the necessary movement of associated parts for controlling the flow respectively of the waste gas and air is also a minimum. A further object of the invention resides in the provision of means to insure suitable sealing against leakage; also, in a construction which will admit of cleaning of the regenerative mass while the preheater is in service and wherein pockets in which soot and dirt might collect are substantially eliminated. A still further object of the invention resides in the improved cellular structure composing the regenerative mass.

To this end, the invention comprises a mass affording a heat interchanger member consisting of a succession of narrow compartments containing elements for absorbing heat, said heat interchanger being located intermediate the two hoods between which and the heat interchanging mass relative movement is effected for distributing and removing the gas and air with reference to the said mass. These hoods in turn are arranged to be in continuous communication with suitable air and gas ducts or conduits for supplying and removing the gas and air respectively supplied thereto, the distribution being effected in such a manner that waste gas is progressively directed thru successive sections of the heat interchanging mass followed immediately thereafter by the combustion air to be heated thereby, this operation continuing along the successive sections of the mass in accordance with the relative movement between the mass and the hoods, with flow of air and gas preferably counter-current.

The nature of the invention, however, will best be understood when described in connection with the accompanying drawings, in which—

Fig. 1 is an elevation of one end of the novel preheater.

Fig. 2 is a fragmentary sectional view taken on the line 2—2, Fig. 1.

Fig. 3 is a transverse vertical section thru the preheater.

Fig. 4 is a fragmentary horizontal section taken on the line 4—4, Fig. 3.

Figs. 5 and 6 are fragmentary horizontal sections illustrating modifications in the regenerator construction.

Fig. 7 is a horizontal section thru the preheater, taken on the line 7—7, Fig. 1.

Fig. 8 is a vertical section thru the preheater, taken on the line 8—8, Fig. 3, and looking in the direction of the arrows.

Referring to the drawings, 10 designates a suitable structure or other means of support for the preheater, the latter comprising a regenerator portion 11, upper and lower hoods 12 and 13 respectively and pairs of upper and lower ducts or conduits 14 and 15 respectively, one pair being designed to receive and deliver the waste gases from a furnace or other source of heat (not shown) and the other likewise the air to be heated with the respective fluids directed counter-currently. The hoods 12 and 13 and the regenerator portion 11 of the apparatus are designed for relative reciprocatory movement therebetween; and, generally, it is preferred to impart the reciprocatory movement to the former, which to this end are carried by I-beams 16 and 17 respectively, the latter resting upon rollers 18 while the former is supported upon pairs of rollers 19. The respective rollers in turn are supported from I-beams 20 thru hangers or yokes 21 and 22 respectively, it being noted that the rollers 19 are angularly disposed in their supporting yokes 21 to conform to the underface of the flange of the I-beam, the flanges of the respective I-beams bearing upon the peripheries of the respective rollers and the I-beam 16 being suspended upon its rollers while the I-beam 17 rests upon its rollers. In installing the apparatus, suitable shims 23 may be inserted between the yokes and beams to take care of any deflection of the beams; whereupon when the heat is applied, further adjustment to provide proper clearance between the hoods and regenerator mass may be made by removing such shims as may be necessary or inserting additional ones as the case may be.

To effect reciprocation of the respective hoods, there are connected to the webs of the respective I-beams one of the ends of connecting rods 25 and 26, whose other ends are mounted upon the respective ends of a crank shaft 27 for imparting the reciprocation, said shaft in turn being rotated by a worm gear 28 and worm 29 of an electric motor or other suitable driving device 30.

In view of the peculiar construction of the hoods, and as will hereinafter be more fully described, the walls of both the upper and lower hood portions at one side will project beyond an end of the housing or duct therefor during certain periods of the reciprocation of said hoods; and the upper and lower hood portions at the opposite side will project at times beyond the other end of the housing. In order to conserve space and material in the construction of the apparatus, there is secured to the said housing or duct 14 or 15 at the ends at which such walls would project, oppositely disposed angle pieces 35 and 36, the same being separated a sufficient distance to allow the projecting wall portion 37 of a hood to pass therebetween and to allow for the provision of a suitable stuffing box 38 or the like to insure a substantial seal at this point, it being understood that a corresponding opening or slit 39 must necessarily be provided in the housing or end walls to permit the wall 37 to move therethru. The packing material employed for this purpose may consist of asbestos or magnesia fibre or other suitable resilient and fire resisting material.

In the construction of the hoods, the arrangement is such as to provide a succession of adjacent and longitudinally disposed compartments 40 therein, the compartments preferably being triangular in section with bottoms 41 thereof open and lying in a common plane contiguous to the corresponding portion of the regenerator 11. In providing these hoods of substantially triangular cross-section, the effect of the closed spaces in cutting down the area for fluid passage is wholly or partly compensated for, depending on the angles selected. It further provides for a more gradual change in form of fluid passages within the apparatus. The two top portions of each of the respective compartments 40 are, however, entirely open at the one portion and closed at the corresponding other portion, the arrangement with respect to successive compartments being such that the tops provide two rows of alternate openings 42 and closures 43 along the two sides of the hoods and the same being staggered relatively to each other. Inclined deflector walls 44 may be provided in the respective compartments to act as baffles for the fluids to be introduced therein. The corresponding ducts as hereinbefore set forth for supplying the fluids fit over the top of the respective hoods, suitable expansion joints as the corrugated joints 45 being provided between the same to accommodate the effects of the different temperatures to which the apparatus is exposed. The said ducts, moreover, are separated from each other substantially along the ridge portion of the corresponding hoods so that along one set of the succession of openings and closures at one side of the apparatus, for example, gas will be supplied or removed while thru the other air will be respectively removed or supplied. The degree of reciprocation imparted to the said hoods will be adjusted, of course, to suit the widths of the openings 42 thereof and progressively cuts off the supply to the regenerator compartments as the dividing wall of a hood compartment passes the free edges of the regenerator compartments.

These regenerator compartments are best provided by a series of separated metal plates 46 with intermediate heat interchanging spacing members such as the corrugated metal plates 47, all being mounted in the regenerator casing 11 and transversely thereof with the free upper and lower edges of the plates lying in surfaces generated by lines moving parallel to the direction of reciprocation of the juxtaposed edges of the hood compartments which conform thereto. In order to insure the sealing of the ends of the respective plates 46 so that no leakage or intermixture of gas and air may occur between successive compartments, the inner sides of the casing 11 are covered with a more or less resilient and heat resisting lining 48 as of asbestos or magnesia fibre, which may also be continued over the inner faces of the ends of the casing for insulating purposes. The plates are so fitted with respect to the width of the casing that, prior to the application of heat thereto, their ends are in contact with said lining; and thus when heat is applied, the expansion of the plates will insure a tight fit so that no leakage may occur around the same, the resilient material 48 accommodating the expansion. Figs. 5 and 6 show a modified construction wherein additional provision is made to insure the seal, in that the ends of a plurality of plates are closed in and joined together to provide intermediate pockets 50 between successive groups which pockets are filled with heat resisting material 51 similar to the lining material 48 and serving also as a retainer for the said lining. It will be observed that to accomplish this, the compartment forming plates are arranged in groups, two plates forming the groups indicated in Fig. 5 and three in Fig. 6. In the construction of the latter figure, the two outer plates 52 and 53 have their ends closed in to the end of an intermediate plate 54 and are joined thereto as by welding.

The novel regenerative air preheater hereinbefore described allows for an efficient utilization of space which, as understood, is generally limited in boiler plant construction; and permits, also, of duct constructions with fewer turns and consequently less draft loss. An initial saving in cost of power plant construction also results therefrom and it is possible to install such preheater apparatus where the use of other constructions would be impracticable, if not impossible. The peculiar arrangement set forth affords, furthermore, economy in construction in view of the fact that the apparatus required can be constructed chiefly of standard size metal plates and structural steel forms.

The fact that the regenerative mass which, of necessity, involves considerable weight may remain stationary results also in less wear and tear and considerably less power consumption in the operation thereof. No substantial fluctuations or pulsations in either the gas pressure or air pressure result from the novel manner of operating the regenerator, thus further enhancing operation, it being well understood that such fluctuations or pulsations are particularly detrimental in modern boiler installations in interfering with the operation of automatic combustion control and destroying the desired balanced draft condition in the furnace with consequent increased maintenance and attendant evils. The construction provides, also, for the protection of the supporting and retaining members for the regenerative mass from the effect of high temperatures, thus eliminating warping common to many constructions and which prevents proper sealing and results in undue wear. As was already intimated, the construction facilitates cleaning of the regenerative mass with air, steam jet or by washing with water; and there are no dead pockets therein to trap soot or cinders. Furthermore, the cleaning operation may be accomplished without interfering with the operation of the regenerative or heat interchanging mass. This mass, moreover, is in active service as a whole during the complete cycle of operations thus giving maximum efficiency in the use of the heating surface and which is not the case in any of the prior forms of regenerator apparatus. The peculiar and novel construction, furthermore, of the reciprocating distributing members permits of the employment of a rectangular arrangement of regenerative mass having an area only slightly greater in a section perpendicular to the flow of fluids than that of the ducts supplying air and gas thereto, whereby the least possible cubical contents for the heater are required. The duct arrangement itself is of such compact design as not to lose the advantages gained by the small space occupied by the regenerator and the flow of gas and air therethru is accomplished with minimum directional change, thus giving low draft loss and resulting in lower pumping costs.

I claim:—

1. In a regenerator preheater for air: a regenerative member comprising a casing open at the top and bottom and having a resilient lining of fire resisting material, and heat interchanging units mounted within said casing each unit comprising separated metal plates secured at the ends and disposed transversely therein with heat interchanging members located between said plates to permit the passage of gases therethru, said secured plate ends abutting freely against the said lining to provide a substantial seal between successive compartments afforded by the respective units and end pockets between the units, and resilient fire resisting packing disposed in the said pockets formed between the respective ends of the said units.

2. In a regenerative preheater for air: a regenerator member comprising a casing open at the top and bottom and having a resilient lining of fire resisting material, and heat interchanging units mounted within said casing each unit comprising an intermediate plate and two outer plates displaced therefrom and disposed transversely in said casing with heat interchanging members located between said plates to permit the passage of gases therethru, respective opposite ends of all of the plates of a unit being secured to one another and abutting freely against the said lining to provide a substantial seal between successive compartments afforded by the respective units and end pockets between the units, and resilient fire-resisting packing disposed in said pockets.

3. A regenerative preheater for air and the like in furnace plants, comprising an open-ended casing a regenerative mass therein consisting of continuous alternate plain and corrugated heat-interchanging plates affording uninterrupted channels between the said ends of the casing and all of said plates extending the full length of the corresponding casing walls; a pair of distributing hoods located respectively at the casing ends; means to effect a relative continuous reciprocation between the hoods and the channels afforded by the successive plates, partitions dividing said hoods longitudinally into transverse compartments and all of the plates extending to the planes in which the ends of the hoods and partitions thereof reciprocate, and said hoods also being entirely open at the portion contiguous to said mass to deliver fluid directly thereto, and having also adjacent rows of alternate openings and closures along the top staggered relatively to each other; and adjacent ducts contiguous to and conforming to tops of the respective hoods for supplying and removing air and gas through corresponding openings therein.

4. A regenerative preheater for air and the like in furnace plants, comprising an open-ended casing, a regenerative mass therein consisting of continuous alternate plain and corrugated heat-interchanging plates affording uninterrupted channels between the said ends of the casing and all of said plates extending the full length of the corresponding casing walls; a pair of distributing hoods located respectively at the casing ends, and means to reciprocate continuously said hoods transversely of the successive channels and in unison, partitions dividing said hoods longitudinally into transverse compartments and all of the plates extending to the planes in which the ends of the hoods and partitions thereof reciprocate, and said hoods also being entirely open at the portion contiguous to said mass to deliver fluid directly thereto, and having also adjacent rows of alternate openings and closures along the top staggered relatively to each other; adjacent ducts contiguous to and conforming to tops of the respective hoods for supplying and removing air and gas through corresponding openings therein, and the end walls of the ducts having openings adapted to permit the end of the hood to pass therethrough during reciprocation; and means to seal said openings in the ducts.

5. A regenerative preheater for air and the like in furnace plants, comprising an open-ended casing, a regenerative mass therein consisting of continuous alternate plain and corrugated heat-interchanging plates affording uninterrupted channels between the said ends of the casing and all of said plates extending the full length of the corresponding casing walls; a pair of distributing hoods located respectively at the casing ends; means to effect a relative continuous reciprocation between the hoods and the channels afforded by the successive plates, said hoods being triangular in cross-section, partitions dividing said hoods longitudinally into transverse compartments and all of the plates extending to the planes in which the ends of the hoods and partitions thereof reciprocate, and said hoods also being entirely open at the portion contiguous to said mass to deliver fluid directly thereto, and having also adjacent rows of alternate openings and closures along the top staggered relatively to each other; and adjacent ducts contiguous to and conforming to tops of the respective hoods for supplying and removing air and gas through corresponding openings therein.

6. A regenerative preheater for air and the like in furnace plants, comprising an open-ended casing, a regenerative mass therein consisting of continuous alternate plain and corrugated heat-interchanging plates affording uninterrupted channels between the said ends of the casing and all of said plates extending the full length of the corresponding casing walls; a pair of distributing hoods located respectively at the casing ends; means to effect a relative continuous reciprocation between the hoods and the channels afforded by the successive plates, partitions dividing said hoods longitudinally into transverse compartments and all of the plates extending to the planes in which the ends of the hoods and partitions thereof reciprocate, and said hoods also being entirely open at the portion contiguous to said mass to deliver fluid directly thereto, and having also adjacent rows of alternate openings and closures along the top staggered relatively to each other; deflector walls within the hoods to act as baffles for the fluids introduced therein; and adjacent ducts contiguous to and conforming to tops of the respective hoods for supplying and removing air and gas through corresponding openings therein.

In testimony whereof I affix my signature.

GEORGE C. COOK.